No. 785,594. PATENTED MAR. 21, 1905.
C. G. CRISPIN.
VALVE.
APPLICATION FILED NOV. 11, 1904.
2 SHEETS—SHEET 1.
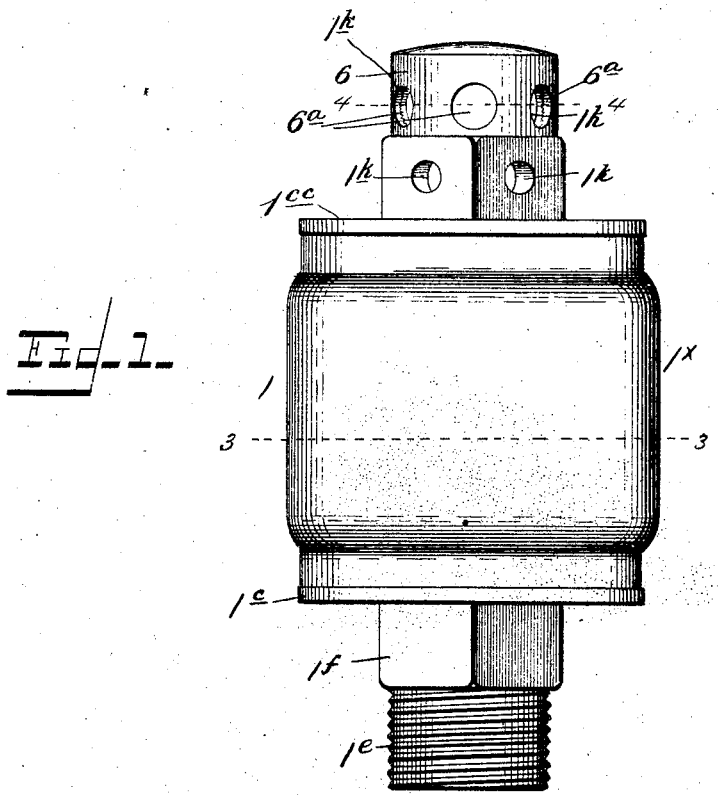
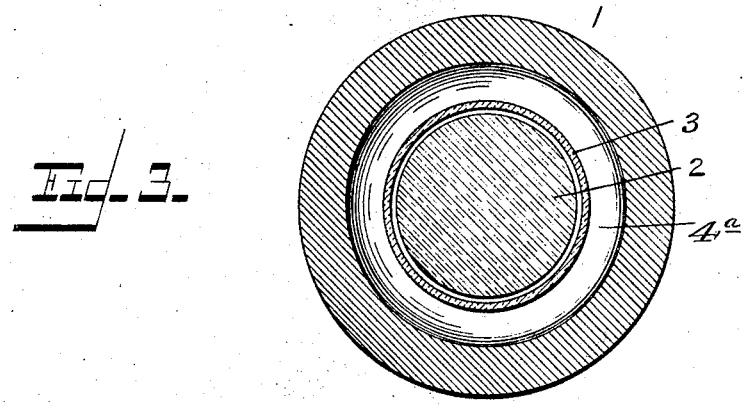
WITNESSES:
INVENTOR.
Clarence G. Crispin
BY
Louis Bagger & Co.,
Attorneys No. 785,594. PATENTED MAR. 21, 1905.
C. G. CRISPIN.
VALVE.
APPLICATION FILED NOV. 11, 1904.
2 SHEETS—SHEET 2.
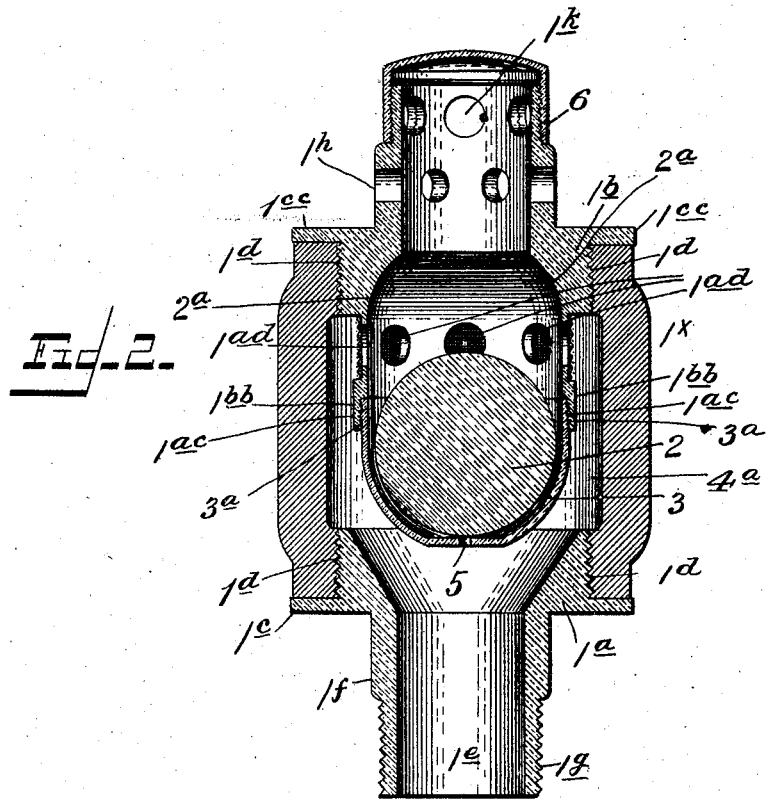
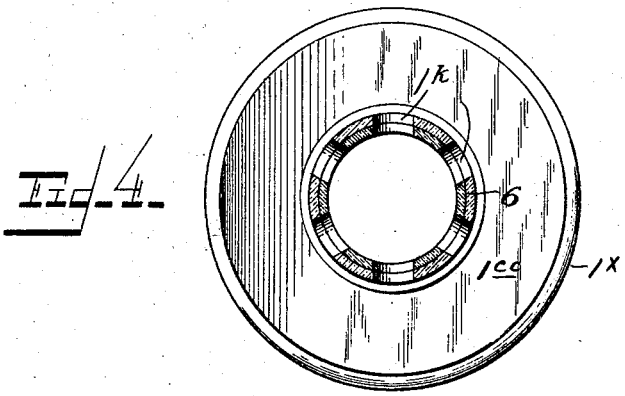
WITNESSES:
INVENTOR:
Clarence G. Crispin.
BY
Louis Bagger & Co.
Attorneys No. 785,594. Patented March 21, 1905.

UNITED STATES PATENT OFFICE.

CLARENCE GEARHART CRISPIN, OF BERWICK, PENNSYLVANIA.

VALVE.

SPECIFICATION forming part of Letters Patent No. 785,594, dated March 21, 1905.

Application filed November 11, 1904. Serial No. 232,340.

*To all whom it may concern:*

Be it known that I, CLARENCE GEARHART CRISPIN, a citizen of the United States, residing at Berwick, in the county of Columbia and State of Pennsylvania, have invented new and useful Improvements in Valves, of which the following is a specification.

My invention relates to improvements in that class of valves especially applicable or serviceable for water mains or pipes.

It has for its object to provide for venting such water mains or pipes or the release of confined air when admitting water thereto; also, for the admission of air thereinto when the water is withdrawn or otherwise escapes therefrom, and to carry out these ends in a simple and effective manner.

Said invention therefore consists of certain structural features, substantially as hereinafter more fully disclosed, and particularly pointed out by the claims.

In the accompanying drawings, illustrating the preferred embodiment of my invention, Figure 1 is a side elevation thereof. Fig. 2 is a vertical central section of the same. Fig. 3 is a horizontal section produced therethrough upon the lines 3 3 of Fig. 1, and Fig. 4 is a like section taken through the upper row of air-vent openings in the extreme upper end of the device.

In the carrying out of my invention I suitably inclose or house within the principal cylindric member or casing 1 a spherical member or ball 2, forming the valve proper. Said cylindric member comprises two sections $1^a$ $1^b$, each having inward from an annular flange or extension $1^c$ a screw-threaded surface engaged by a correspondingly-screw-threaded sleeve or coupling member $1^\times$, connecting or coupling together said sections, as at $1^d$. As the sleeve or coupling member $1^\times$ is screwed to its maximum limit upon said member sections $1^a$ $1^b$ it will be noted that the flanges $1^{cc}$ of the latter serve as stops and abut the ends of said coupling or sleeve member, serving to effectively assemble the parts.

The casing member lower section $1^a$ has a downward tubular extension $1^e$, whose exterior has thereon an angular or nut formation $1^f$ for convenience, as in applying a wrench thereto to secure the device in position upon the pipe or water-main. Below said angular or nut formation $1^f$ said tubular extension $1^e$ has produced also upon its exterior a screw-thread $1^g$ to render effective its connection with the pipe or water-main, as will be apparent.

The casing member upper section $1^b$ has in continuation of its inner surface also a downward extension or wall $1^{bb}$ of relatively greatly reduced cross-section, with its extreme lower portion offset, the inner surface of the latter being provided with a screw-thread, as at $1^{ac}$, the purpose of which will later appear. Said downward extension or wall $1^{bb}$ is provided with a plurality of orifices or openings $1^{ad}$, whose office will be presently seen.

A cup or receptacle member 3 is arranged within the chamber formed by the parts 1 and $1^\times$, within which rests initially the ball or valve proper, 2, and has its outer surface, near the upper edge, screw-threaded, as at $3^a$, to engage with the screw-threaded surface $1^{ac}$ of the offset $1^{ab}$ of the wall or downward extension $1^{bb}$ to effect connection therebetween and the consequent suspension or support of said cup member in position. Said cup or receptacle member 3 thus forms, with the wall $1^{bb}$, the inner surface of the sleeve $1^\times$, and the inner surfaces of the casing member upper and lower sections $1^b$ $1^a$ a chamber within a chamber, (designated as 4 $4^a$, respectively,) corresponding surface of said lower section being suitably removed or spaced off from said wall and cup or receptacle member for that purpose. In the bottom of said cup member of the inner chamber 4 is a water passage or opening 5, the purpose otherwise of which will be presently apparent. Said casing member upper section has an upward tubular extension $1^h$, and upon the latter is screwed a cap 6, said extension having numerous air orifices or holes $1^k$ and said cap having also orifices $6^a$ in continuation of and registering with the upper of said holes $1^k$ for venting purposes.

As air is forced ahead of water entering the main or pipe to which said valve may be applied said air passes upward through the tubular extension or neck $1^e$ and entering the outer chamber $4^a$ and passing by the valved or closed passage or water way 5 passes through the orifice $1^{ad}$ and into the inner chamber 4 and escapes through the orifice or openings $1^k$ $6^a$ in the upward extension $1^h$ and cap 6 for obvious purposes. It is noted that the extent of the air-pressure exerted at the water-passage 5 is inappreciable in its effect upon the valve 2. Therefore said passage will accordingly remain closed against the escape of air at that point into the inner chamber 4. Again, when the water rises into the valve-casing the water will pass through the opening 5 and engage and force by its continued ingress at that point the valve 2 to its seat, as at $2^a$, in the upper inner surface of the chamber 4, and thus prevent or cut off the escape of said water through the orifices or vents $1^k$.

Latitude is allowed as to details herein, as they may be changed as circumstances suggest without departing from the spirit of my invention.

I claim—

1. A device of the character described, having a chamber within a chamber, and a valve initially closing a port or opening in the lower portion of the inner chamber, the outer chamber having communication with said inner chamber, at a point above said valve.

2. A device of the character described, having a chamber within a chamber, and a valve initially closing a port or opening in the lower portion of the inner chamber, the outer chamber communicating with the inner chamber at a point above said valve, said inner chamber having air-egress openings or outlets also arranged above said valve.

3. A device of the character described, having a chamber within a chamber, and a valve initially closing a port or opening in the lower portion of the inner chamber; the outer chamber having openings communicating with the inner chamber at a point above said valve, and said inner chamber having a seat in its upper portion to receive said valve when removed from over the port or opening initially closed thereby.

4. A device of the character described comprising upper and lower casing-sections, a cylindric coupling member for said sections, said upper section having a downward extension, in continuation of its inner surface, provided with orifices or openings, a cup-like member connected to said downward extension and having a bottom opening, said coupling member having its inner surface spaced off or offset from said downward extension and cup-like member, and a valve initially closing said bottom opening, said upper section adapted to form at its inner upper end a seat for said valve when the latter is lifted from its initial position.

5. A device of the character described, employing two casing-sections coupled together by a cylindric or connecting member, the upper section having a downward extension, in continuation of its inner surface, provided with orifices or openings, said upper section also having an upward capped tubular extension also provided with orifices or openings, a cup-like member connected to said downward extension and having a bottom opening or port, said coupling member having its inner surface spaced off, or offset from said downward extension and cup-like member, and a valve or ball initially closing said bottom opening, said upper section adapted to form at its inner upper end a seat for said valve when the latter is lifted from its initial position.

In testimony whereof I affix my signature in presence of two subscribing witnesses.

CLARENCE GEARHART CRISPIN.

Witnesses:
R. O. BROCKWAY,
J. S. HICKS.